United States Patent
Konishi

(10) Patent No.: US 9,903,883 B2
(45) Date of Patent: Feb. 27, 2018

(54) ANGULAR ACCELERATION SENSOR AND ACCELERATION SENSOR

(71) Applicant: Murata Manufacturing Co., Ltd., Nagaokakyo-shi, Kyoto-fu (JP)

(72) Inventor: Takahiro Konishi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 450 days.

(21) Appl. No.: 14/708,504

(22) Filed: May 11, 2015

(65) Prior Publication Data

US 2015/0241462 A1 Aug. 27, 2015

Related U.S. Application Data

(63) Continuation of application No. PCT/JP2013/080188, filed on Nov. 8, 2013.

(30) Foreign Application Priority Data

Nov. 12, 2012 (JP) .................................. 2012-248774

(51) Int. Cl.
   - *G01P 15/18* (2013.01)
   - *G01P 15/08* (2006.01)
   - *G01P 15/12* (2006.01)

(52) U.S. Cl.
   CPC ........ *G01P 15/0888* (2013.01); *G01P 15/123* (2013.01); *G01P 15/18* (2013.01)

(58) Field of Classification Search
   CPC .............................. G01P 15/18; G01P 15/123
   See application file for complete search history.

(56) References Cited

U.S. PATENT DOCUMENTS

| 5,542,297 A | 8/1996 | Mizuno et al. |
| 6,078,016 A * | 6/2000 | Yoshikawa ......... G01P 15/0802 200/181 |
| 2002/0114053 A1 | 8/2002 | Yasuda et al. |

FOREIGN PATENT DOCUMENTS

| JP | 07-325104 A | 12/1995 |
| JP | 08-160066 A | 6/1996 |

(Continued)

OTHER PUBLICATIONS

Official Communication issued in International Patent Application No. PCT/JP2013/080188, dated Jan. 14, 2014.

*Primary Examiner* — Lisa Caputo
*Assistant Examiner* — Alex Devito
(74) *Attorney, Agent, or Firm* — Keating & Bennett, LLP

(57) ABSTRACT

An angular acceleration sensor includes a stationary portion, a weight portion, a beam including a flat plate portion, one end portion of the flat plate portion in a lengthwise direction thereof being connected to the stationary portion and the other end portion thereof being connected to the weight portion, a central projection that projects in a thickness direction of the flat plate portion, and that is disposed at a center of the flat plate portion in a widthwise direction thereof, and end-side projections that are disposed at opposite ends of the flat plate portion in the widthwise direction, respectively, and that project in the thickness direction of the flat plate portion, and detection elements that are disposed on the flat plate portion at positions different from a center of the flat plate portion in the lengthwise direction, and that detect stress generated in the beam.

10 Claims, 6 Drawing Sheets

(56) References Cited

FOREIGN PATENT DOCUMENTS

| | | |
|---|---|---|
| JP | 2624311 B2 | 6/1997 |
| JP | 2002-321196 A | 11/2002 |
| JP | 2010-048670 A | 3/2010 |
| JP | 2010-048700 A | 3/2010 |
| WO | 2005/062060 A1 | 7/2005 |

* cited by examiner

ANGULAR ACCELERATION SENSOR AND ACCELERATION SENSOR

BACKGROUND OF THE INVENTION

1. Field of the Invention

The present invention relates to an angular acceleration sensor configured to detect an angular acceleration from flexural stress that is generated in a beam, and also relates to an acceleration sensor configured to detect an acceleration from flexural stress that is generated in a beam.

2. Description of the Related Art

Some type of angular acceleration sensor and acceleration sensor includes a weight portion, a beam, and a detection portion, and detects an angular acceleration or an acceleration, each acting on the weight portion, from flexural stress that is generated in the beam supporting the weight portion (see, e.g., Japanese Unexamined Patent Application Publication No. 08-160066).

An example of general configuration of an angular acceleration sensor will be described below.

FIG. 5A is a plan view illustrating a first related-art configuration example of an angular acceleration sensor. In the following description, it is assumed that an axis extending in a flexing direction of a beam is defined as an X-axis of an orthogonal coordinate system, an axis extending in a lengthwise direction of the beam is defined as a Y-axis of the orthogonal coordinate system, and an axis extending perpendicularly to both the X-axis and the Y-axis is defined as a Z-axis of the orthogonal coordinate system.

An angular acceleration sensor 101 according to the first related-art configuration example includes a stationary portion 102, a weight portion 103, a beam 104, and two piezoresistors 105A and 105B. The stationary portion 102 is fixed to, e.g., a not-illustrated casing that is arranged at a position along a direction of the Z-axis relative to the stationary portion 12. The beam 104 extends along the Y-axis in a state floating from the casing, etc. An end portion of the beam 104 on the positive direction side of the Y-axis is connected to the weight portion 103, and an end portion of the beam 104 on the negative direction side of the Y-axis is connected to the stationary portion 102. The weight portion 103 is held in an X-Y plane at a position spaced from the stationary portion 12 in a state floating from the casing, etc. The piezoresistors 105A and 105B are disposed on the beam 104 to lie in an X-Y plane side by side in the X-axis direction, and they have a rectangular shape with a lengthwise direction thereof extending in the Y-axis.

FIG. 5B is a contour view illustrating a distribution of flexure stress that is generated in the beam 104 when the beam 104 is flexed toward the negative direction side of the X-axis in the angular acceleration sensor 101 according to the first related-art configuration example.

In the angular acceleration sensor 101, when an angular acceleration acts on the weight portion 103 in a clockwise direction as viewed from the positive direction of the Z-axis, the beam 104 is flexed toward the negative direction side of the X-axis. Correspondingly, compression stress acts on a region of the beam 104 near a lateral surface thereof on the negative direction side of the X-axis, and tensile stress acts on a region of the beam 104 near a lateral surface thereof on the positive direction side of the X-axis. A line (denoted by a one-dot-chain line) passing a center of the beam 104 as viewed in a widthwise direction (i.e., in an X-axis direction) defines a boundary between the tensile stress and the compression stress.

FIG. 5C is an illustration to explain a detection circuit included in the angular acceleration sensor 101 according to the first related-art configuration example.

The piezoresistors 105A and 105B are connected in series to a constant voltage source, and they constitute a resistive voltage-dividing circuit. The piezoresistors 105A and 105B are arranged parallel to each other on both sides of the line passing the widthwise center of the beam 104. Therefore, when the beam 104 is flexed in the X-axis direction, the compression stress is caused to act on the piezoresistor that is arranged in a region on one side of a neutral plane of the beam 104, and the tensile stress is caused to act on the piezoresistor that is arranged in a region on the other side. Accordingly, the piezoresistors 105A and 105B are expanded and contracted oppositely to each other. A resistance value of the expanded piezoresistor increases, whereas a resistance value of the contracted piezoresistor decreases. Thus, a voltage division ratio between the piezoresistors 105A and 105B in the resistive voltage-dividing circuit is changed, and a voltage across one of the two piezoresistors corresponds to the angular acceleration acting on the weight portion 103.

FIG. 6A is a plan view illustrating a second related-art configuration example of the angular acceleration sensor.

An angular acceleration sensor 201 according to the second related-art configuration example includes a stationary portion 202, a weight portion 203, a beam 204, and four piezoresistors 205A, 205B, 205C and 205D. The stationary portion 202, the weight portion 203, and the beam 204 have similar structures to those described above in the first related-art configuration example. The piezoresistors 205A, 205B, 205C and 205D are arranged not only symmetrically with respect to a line (denoted by a one-dot-chain line in FIG. 6B) passing a center of the beam 204 as viewed in a widthwise direction (i.e., in an X-axis direction), but also symmetrically with respect to a line (not illustrated) passing a center of the beam 204 as viewed in a lengthwise direction (i.e., in a Y-axis direction).

FIG. 6B is an illustration to explain a detection circuit included in the angular acceleration sensor 201 according to the second related-art configuration example.

The piezoresistors 205A, 205B, 205C and 205D constitute a bridge circuit such that every two piezoresistors arranged symmetrically to each other are connected in series, and two sets of serial circuits are connected to a constant voltage source or a constant current source in parallel. In the bridge circuit thus constituted, potentials at two output terminals are changed in mutually reversed polarities upon flexure of the beam 204 in the X-axis direction, and an angular acceleration can be measured by taking out a potential difference between the two output terminals as a voltage variation.

In any of the above-described related-art configuration examples, a distribution of flexure stress occurs on the beam in a state where the beam is flexed, as illustrated in FIG. 5B. Reviewing here the distribution of flexure stress in the Y-axis direction, i.e., the lengthwise direction of the beam, in detail, the flexure stress increases at a position nearer to the center of the beam in the Y-axis direction, and the flexure stress decreases at a position farther away from the center of the beam in the Y-axis direction. Accordingly, when the piezoresistors are arranged at the center of the beam in the Y-axis direction as in the first related-art configuration example, maximum flexure stress is caused to act on the piezoresistors. However, when the piezoresistors are arranged at positions deviated from the center of the beam in the Y-axis direction as in the second related-art configuration example, just smaller flexure stress than the maximum flexure stress is caused to act on the piezoresistors.

Stated in another way, in the related-art configuration examples, since the flexure stress is maximized at the center of the beam in the lengthwise direction of the beam, the maximum flexure stress cannot be detected by the piezoresistors when the piezoresistors are arranged at positions deviated from the center of the beam in the lengthwise direction of the beam. This leads to a problem that stress generated in the beam cannot be efficiently detected by the piezoresistors, and sensitivity of the angular acceleration sensor is low. Such a problem occurs not only in the angular acceleration sensor, but also in an acceleration sensor which includes a stationary portion, a weight portion, a beam, and a piezoresistor, in a similar way.

SUMMARY OF THE INVENTION

Accordingly, preferred embodiments of the present invention provide an angular acceleration sensor and an acceleration sensor in which maximum flexure stress generated in a beam is detected by a piezoresistor disposed at a position different from a center of the beam in a lengthwise direction thereof, and in which sensitivity is high.

An angular acceleration sensor according to a preferred embodiment of the present invention includes a stationary portion, a weight portion, a beam, and detection elements. The weight portion is supported in a movable manner. The beam includes a flat plate portion, a central projection, and a plurality of end-side projections. The flat plate portion is in the form of a flat plate, one end portion of the flat plate portion in an extended direction, i.e., a lengthwise direction thereof being connected to the stationary portion and the other end portion thereof being connected to the weight portion. The central projection projects in a thickness direction of the flat plate portion, the thickness direction being perpendicular or substantially perpendicular to the lengthwise direction, and is disposed at a center of the flat plate portion in a widthwise direction perpendicular or substantially perpendicular to both the lengthwise direction and the thickness direction of the flat plate portion. The plural end-side projections are disposed at opposite ends of the flat plate portion in the widthwise direction, respectively, and project in the thickness direction of the flat plate portion. The plural detection elements are disposed on the flat plate portion at positions different from a center of the flat plate portion in the lengthwise direction, and detect stress generated in the beam.

In the angular acceleration sensor according to a preferred embodiment of the present invention, preferably, the central projection is disposed to pass a center of the support beam when viewed in a plane defined by the lengthwise direction and the widthwise direction of the flat plate portion.

In the angular acceleration sensor according to a preferred embodiment of the present invention, preferably, one end portion of the central projection in the lengthwise direction of the flat plate portion is connected to the stationary portion, and the other end portion thereof is connected to the weight portion.

In the angular acceleration sensor according to a preferred embodiment of the present invention, preferably, the plural end-side projections include a first end-side projection, a second end-side projection, a third end-side projection, and a fourth end-side projection. The first end-side projection is disposed in one end portion of the flat plate portion in the widthwise direction, one end portion of the first end-side projection in the lengthwise direction of the flat plate portion being connected to the stationary portion and the other end portion thereof being located at a position closer to the stationary portion than the center of the flat plate portion in the lengthwise direction. The second end-side projection is disposed in the one end portion of the flat plate portion in the widthwise direction, one end portion of the second end-side projection in the lengthwise direction of the flat plate portion being connected to the weight portion and the other end portion thereof being located at a position closer to the weight portion than the center of the flat plate portion in the lengthwise direction. The third end-side projection is disposed in the other end portion of the flat plate portion in the widthwise direction, one end portion of the third end-side projection in the lengthwise direction of the flat plate portion being connected to the stationary portion and the other end portion thereof being located at a position closer to the stationary portion than the center of the flat plate portion in the lengthwise direction. The fourth end-side projection is disposed in the other end portion of the flat plate portion in the widthwise direction, one end portion of the fourth end-side projection in the lengthwise direction of the flat plate portion being connected to the weight portion and the other end portion thereof being located at a position closer to the weight portion than the center of the flat plate portion in the lengthwise direction.

Preferably, the plural detection elements include a detection element opposed to the first end-side projection in the thickness direction of the flat plate portion, a detection element opposed to the second end-side projection in the thickness direction of the flat plate portion, a detection element opposed to the third end-side projection in the thickness direction of the flat plate portion, and a detection element opposed to the fourth end-side projection in the thickness direction of the flat plate portion. More preferably, the plural detection elements configure a bridge circuit.

An acceleration sensor according to a preferred embodiment of the present invention includes a stationary portion, a weight portion, a beam, and detection elements. The weight portion is supported in a displaceable state. The beam includes a flat plate portion, a central projection, and a plurality of end-side projections. The flat plate portion is in the form of a flat plate, one end portion of the flat plate portion in a lengthwise direction thereof being connected to the stationary portion and the other end portion thereof being connected to the weight portion. The central projection projects in a thickness direction of the flat plate portion, the thickness direction being perpendicular or substantially perpendicular to the lengthwise direction, and is disposed at a center of the flat plate portion in a widthwise direction perpendicular to both the lengthwise direction and the thickness direction of the flat plate portion. The plural end-side projections are disposed at opposite ends of the flat plate portion in the widthwise direction, respectively, and project in the thickness direction of the flat plate portion. The plural detection elements are disposed on the flat plate portion at positions different from a center of the flat plate portion in the lengthwise direction, and detect stress generated in the beam.

In the acceleration sensor according to a preferred embodiment of the present invention, preferably, the central projection is disposed to pass a center of the support beam when viewed in a plane defined by the lengthwise direction and the widthwise direction of the flat plate portion.

In the acceleration sensor according to a preferred embodiment of the present invention, preferably, one end portion of the central projection in the lengthwise direction of the flat plate portion is connected to the stationary portion, and the other end portion thereof is connected to the weight portion.

In the acceleration sensor according to a preferred embodiment of the present invention, preferably, the plural end-side projections include a first end-side projection, a second end-side projection, a third end-side projection, and a fourth end-side projection. The first end-side projection is disposed in one end portion of the flat plate portion in the widthwise direction, one end portion of the first end-side projection in the lengthwise direction of the flat plate portion being connected to the stationary portion and the other end portion thereof being located at a position closer to the stationary portion than the center of the flat plate portion in the lengthwise direction. The second end-side projection is disposed in the one end portion of the flat plate portion in the widthwise direction, one end portion of the second end-side projection in the lengthwise direction of the flat plate portion being connected to the weight portion and the other end portion thereof being located at a position closer to the weight portion than the center of the flat plate portion in the lengthwise direction. The third end-side projection is disposed in the other end portion of the flat plate portion in the widthwise direction, one end portion of the third end-side projection in the lengthwise direction of the flat plate portion being connected to the stationary portion and the other end portion thereof being located at a position closer to the stationary portion than the center of the flat plate portion in the lengthwise direction. The fourth end-side projection is disposed in the other end portion of the flat plate portion in the widthwise direction, one end portion of the fourth end-side projection in the lengthwise direction of the flat plate portion being connected to the weight portion and the other end portion thereof being located at a position closer to the weight portion than the center of the flat plate portion in the lengthwise direction.

Preferably, the plural detection elements include a detection element opposed to the first end-side projection in the thickness direction of the flat plate portion, a detection element opposed to the second end-side projection in the thickness direction of the flat plate portion, a detection element opposed to the third end-side projection in the thickness direction of the flat plate portion, and a detection element opposed to the fourth end-side projection in the thickness direction of the flat plate portion. More preferably, the plural detection elements configure a bridge circuit.

According to a preferred embodiment of the present invention, since the beam includes the flat plate portion, the central projection, and the end-side projections, the detection elements are able to be disposed at positions where maximum flexure stress is generated in the beam. As a result, the maximum flexure stress generated in the beam is detected by the detection elements, and sensitivity is increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An angular acceleration sensor according to a preferred embodiment of the present invention will be described below. In the following description, it is assumed that a detection axis of the angular acceleration sensor is defined as a Z-axis of an orthogonal coordinate system, an axis extending in a lengthwise direction of a beam is defined as a Y-axis of the orthogonal coordinate system, and an axis extending in a flexing direction of the beam is defined as an X-axis of the orthogonal coordinate system.

Figure 1:
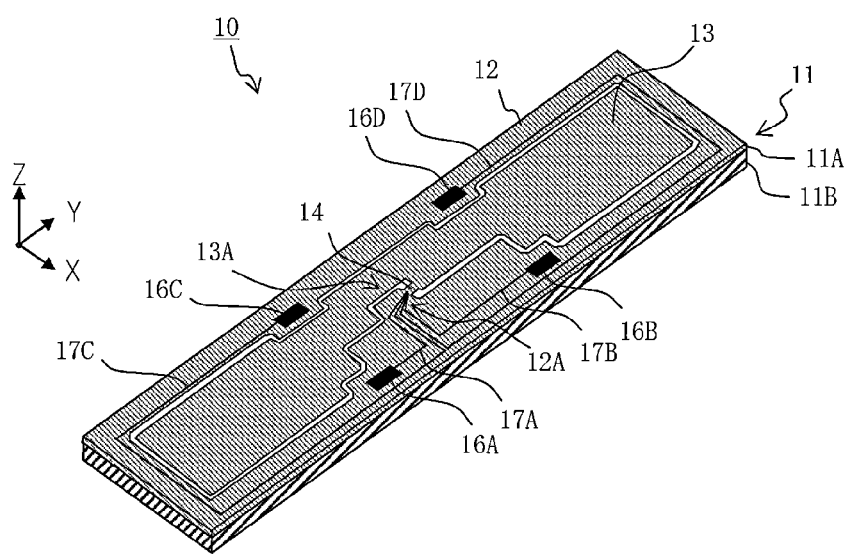
FIG. 1 is a perspective view to explain a configuration of an angular acceleration sensor according to a first preferred embodiment of the present invention.

FIG. 1 is a perspective view to explain a configuration of an angular acceleration sensor 10 according to a first preferred embodiment of the present invention.

The angular acceleration sensor 10 includes a substrate portion 11, piezoresistors 15A, 15B, 15C and 15D, terminal electrodes 16A, 16B, 16C and 16D, and wiring lines 17A, 17B, 17C and 17D. In FIG. 1, the piezoresistors 15A, 15B, 15C and 15D are not illustrated.

The substrate portion 11 preferably is in the form of a rectangular or a substantially rectangular flat plate in which a lengthwise direction is set to be the direction along the Y-axis, a widthwise direction is set to be the direction along the X-axis, and a thickness direction is set to be the direction along the Z-axis. In the substrate portion 11, a stationary portion 12, a weight portion 13, and a beam 14 are preferably defined by an opening configured to penetrate through the substrate portion 11 between two surfaces opposed to each other in the Z-axis direction.

The substrate portion 11 is formed preferably by processing an SOI (Silicon On Insulator) substrate. The substrate portion 11 includes an SOI layer 11A positioned on the positive direction side of the Z-axis, and a base layer 11B positioned on the negative direction side of the Z-axis. The SOI layer 11A and the base layer 11B are insulated from each other by an insulating film. The SOI layer 11A and the base layer 11B are each made of a silicon-based material, and the insulating film is made of an insulating material, such as silicon dioxide ($SiO_2$).

The stationary portion 12 preferably has a ring-shaped configuration in an outer peripheral region of the substrate portion 11, and it surrounds the weight portion 13 and the beam when viewed in an X-Y plane. In other words, the weight portion 13 and the beam 14 are disposed within an opening of the stationary portion 12. The stationary portion 12 is fixed to, e.g., a not-illustrated casing.

The beam 14 preferably has a rectangular or substantially rectangular shape in which a lengthwise direction is set to be the direction along the Y-axis, and a widthwise direction is set to be the direction along the X-axis when viewed in an X-Y plane. The beam 14 extends in the Y-axis direction from an inner wall surface of the opening of the stationary portion 12. The beam 14 is supported by the stationary portion 12 in a state floating from the not-illustrated casing, etc.

The weight portion 13 is connected to the beam 14 and is disposed within the opening of the stationary portion 12 when viewed in an X-Y plane. The weight portion 13 is supported by the beam 14 and the stationary portion 12 in a displaceable manner in a state floating from the not-illustrated casing, etc.

The weight portion 13 is disposed with a widthwise direction set to be the direction along the X-axis and a lengthwise direction set to be the direction along the Y-axis when viewed in an X-Y plane. A recess 13A is provided in the weight portion 13 such that a central region of the weight portion 13 on the positive direction side of the X-axis is recessed toward the negative direction side of the X-axis in plural (three) steps. The stationary portion 12 is opposed to the weight portion 13 with an opening interposed between them when viewed in an X-Y plane. The stationary portion 12 includes a projection 12A that projects toward the negative direction side of the X-axis in plural (three) steps in opposed relation to the recess 13A. The beam 14 extends in the Y-axis direction from a wall surface of a region of the projection 12A on the positive direction side of the Y-axis near its distal end, and is connected to a wall surface of a region of the weight portion 13 on the negative direction side of the Y-axis at a bottom of the recess 13A.

By providing the weight portion 13 and the stationary portion 12 in the above-described shapes, the beam 14 is arranged at a position of the center of gravity of the weight portion 13 in the X-Y plane. Therefore, when an angular acceleration with the Z-axis being a rotation axis acts on the weight portion 13, rotation is well balanced even with the weight portion 13 supported by one beam 14, such that all rotational inertia forces are concentrated on the beam 14 and the beam 14 is flexed to a large extent. Moreover, because opposite end portions of the weight portion 13 in the Y-axis direction, those end portions being positioned apart from the beam 14, are relatively wide in the X-axis direction and the mass of the weight portion 13 is concentrated in the Y-axial opposite end portions thereof, an inertia moment acting on the beam 14 by the angular acceleration with the Z-axis being a rotation axis is increased. As a result, in the angular acceleration sensor 10, the beam 14 is more susceptible to flexure by the angular acceleration with the Z-axis being a rotation axis, and sensitivity in detection of the angular acceleration is increased.

The terminal electrodes 16A, 16B, 16C and 16D are disposed on a surface of the stationary portion 12 on the positive direction side of the Z-axis. The terminal electrode 16A and the terminal electrode 16B are arranged along a side of the stationary portion 12 on the positive direction side of the X-axis, and the terminal electrode 16C and the terminal electrode 16D are arranged along a side of the stationary portion 12 on the negative direction side of the X-axis. Furthermore, the terminal electrode 16A is arranged along the side of the stationary portion 12 on the positive direction side of the X-axis at a position on the negative direction side of the Y-axis, and the terminal electrode 16B is arranged along the side of the stationary portion 12 on the positive direction side of the X-axis at a position on the positive direction side of the Y-axis. The terminal electrode 16C is arranged along the side of the stationary portion 12 on the negative direction side of the X-axis at a position on the negative direction side of the Y-axis, and the terminal electrode 16D is arranged along the side of the stationary portion 12 on the negative direction side of the X-axis at a position on the positive direction side of the Y-axis.

The wiring lines 17A, 17B, 17C and 17D are disposed on surfaces of the stationary portion 12 and the beam 14 on the positive direction side of the Z-axis. The wiring line 17A includes one end connected to the terminal electrode 16A, and the other end connected to the piezoresistor 15A described later. The wiring line 17B includes one end connected to the terminal electrode 16B, and the other end connected to the piezoresistor 15B described later. The wiring line 17C includes one end connected to the terminal electrode 16C, and the other end connected to the piezoresistor 15C described later. The wiring line 17D includes one end connected to the terminal electrode 16D, and the other end connected to the piezoresistor 15D described later. Thus, the terminal electrode 16A is electrically connected to the piezoresistor 15A through the wiring line 17A, and the terminal electrode 16B is electrically connected to the piezoresistor 15B through the wiring line 17B. The terminal electrode 16C is electrically connected to the piezoresistor 15C through the wiring line 17C, and the terminal electrode 16D is electrically connected to the piezoresistor 15D through the wiring line 17D.

Figure 2A:
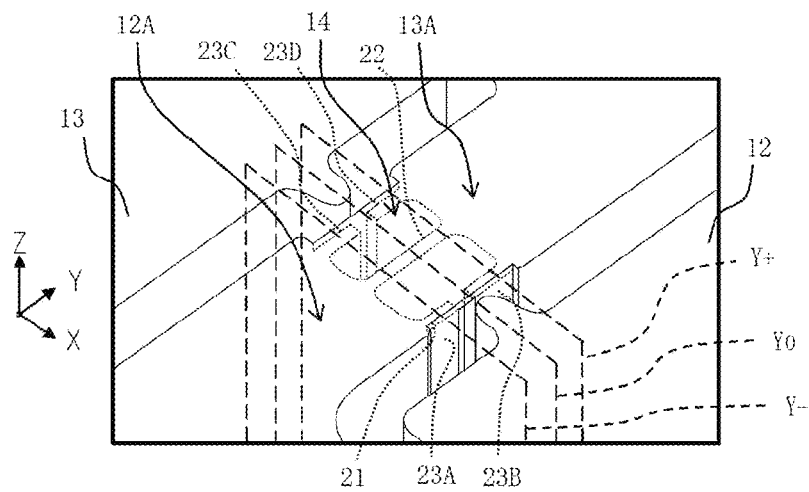
FIGS. 2A to 2D are illustrations to explain a structure around a beam included in the angular acceleration sensor according to the first preferred embodiment of the present invention.
Figure 2B:
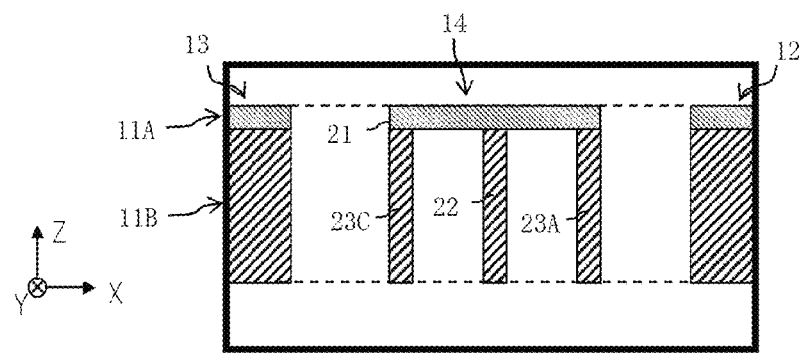
Figure 2C:
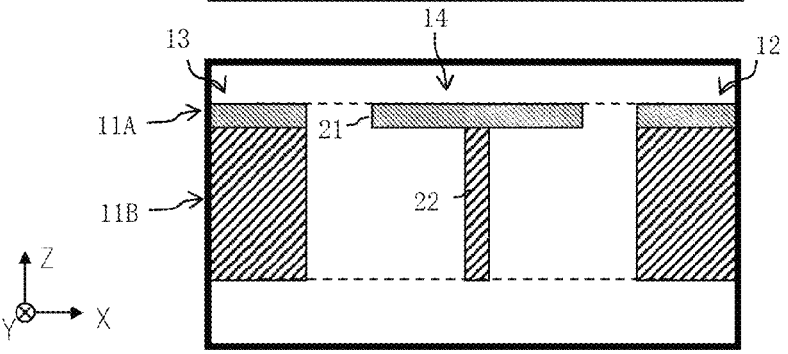
Figure 2D:
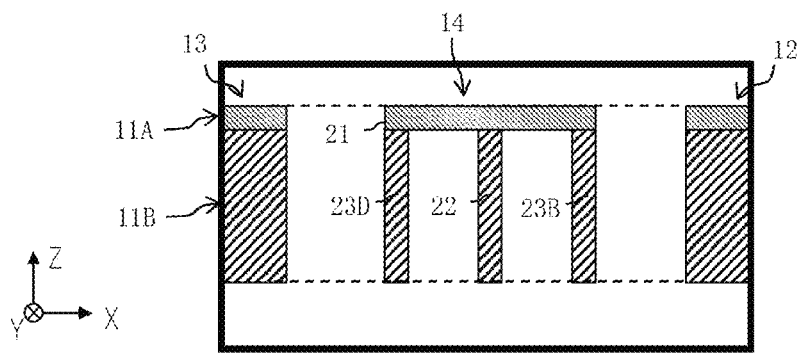

FIGS. 2A-2D are illustrations to explain a structure around the beam 14. Specifically, FIG. 2A is a perspective view. FIG. 2B is a sectional view taken along an X-Z plane at a position denoted by a $Y_-$ plane in FIG. 2A. FIG. 2C is a sectional view taken along an X-Z plane at a position denoted by a $Y_0$ plane in FIG. 2A. FIG. 2D is a sectional view taken along an X-Z plane at a position denoted by a $Y_+$ plane in FIG. 2A. The $Y_0$ plane passes a center of the beam 14. The $Y_-$ plane is positioned on the more negative direction side of the Y-axis than the $Y_0$ plane. The $Y_+$ plane is positioned on the more positive direction side of the Y-axis than the $Y_0$ plane.

An end portion of the beam 14 on the negative direction side of the Y-axis is connected to the stationary portion 12, and an end portion of the beam 14 on the positive direction side of the Y-axis is connected to the weight portion 13. Rigidity of the beam 14 preferably is set to be lower than those of the stationary portion 12 and the weight portion 13 such that flexure is concentrated on the beam 14.

In the beam 14, the SOI layer 11A is disposed over an entire region between the end portion of the beam 14 on the positive direction side of the Y-axis and the end portion thereof on the negative direction side of the Y-axis, whereas the base layer 11B is disposed only in particular regions between the end portion of the beam 14 on the positive direction side of the Y-axis and the end portion thereof on the negative direction side of the Y-axis.

To explain in more detail, the beam 14 includes a flat plate portion 21, a central projection 22, a first end-side projection 23A, a second end-side projection 23B, a third end-side projection 23C, and a fourth end-side projection 23D. The flat plate portion 21 is made of the SOI layer 11A and is in the form of a flat plate in which a lengthwise direction is set to be the direction along the Y-axis, a widthwise direction is set to be the direction along the X-axis, and a thickness direction is set to be the direction along the Z-axis. The flat plate portion 21 includes a surface on the positive direction side of the Z-axis and a surface on the negative direction side of the Z-axis, those surfaces being parallel or substantially parallel to an X-Y plane. An end portion of the flat plate portion 21 on the negative direction side of the Y-axis is connected to the stationary portion 12, and an end portion of the flat plate portion 21 on the positive direction side of the Y-axis is connected to the weight portion 13.

The central projection 22 preferably is in the form of a rectangular or substantially rectangular parallelepiped in which a lengthwise direction is set to be the direction along the Y-axis, a widthwise direction is set to be the direction along the X-axis, and a thickness direction is set to be the direction along the Z-axis. The central projection 22 is disposed to project from the surface of the flat plate portion 21 on the negative direction side of the Z-axis toward the negative direction side of the Z-axis. The central projection 22 is made of the base layer 11B. The central projection 22 is disposed in an X-axial central region of the surface of the flat plate portion 21 on the negative direction side of the Z-axis to extend along the Y-axis. Thus, the central projection 22 is disposed to pass the center of the beam 14 when viewed in an X-Y plane. An end portion of the central projection 22 on the negative direction side of the Y-axis is connected to the stationary portion 12, and an end portion of the central projection 22 on the positive direction side of the Y-axis is connected to the weight portion 13.

The first to fourth end-side projections 23A to 23D are each preferably in the form of a rectangular or substantially rectangular parallelepiped in which a lengthwise direction is set to be the direction along the Y-axis, a widthwise direction is set to be the direction along the X-axis, and a thickness direction is set to be the direction along the Z-axis. Each end-side projection is disposed to project from the surface of the flat plate portion 21 on the negative direction side of the Z-axis toward the negative direction side of the Z axis. The first to fourth end-side projections 23A to 23D are each made of the base layer 11B. The first end-side projection 23A and the second end-side projection 23B are disposed on the surface of the flat plate portion 21 on the negative direction side of the Z-axis at an end portion of that surface on the positive direction side of the X-axis to extend along the Y-axis. The third end-side projection 23C and the fourth end-side projection 23D are disposed on the surface of the flat plate portion 21 on the negative direction side of the Z-axis at an end portion of that surface on the negative direction side of the X-axis to extend along the Y-axis.

An end portion of the first end-side projection 23A on the negative direction side of the Y-axis is connected to the stationary portion 12. An end portion of the first end-side projection 23A on the positive direction side of the Y-axis is positioned on the more negative direction side of the Y-axis than a Y-axial center of the flat plate portion 21 in its end portion on the positive direction side of the X-axis. An end portion of the second end-side projection 23A on the positive direction side of the Y-axis is connected to the weight portion 13. An end portion of the second end-side projection 23B on the negative direction side of the Y-axis is positioned on the more positive direction side of the Y-axis than the Y-axial center of the flat plate portion 21 in its end portion on the positive direction side of the X-axis.

An end portion of the third end-side projection 23C on the negative direction side of the Y-axis is connected to the stationary portion 12. An end portion of the third end-side projection 23C on the positive direction side of the Y-axis is positioned on the more negative direction side of the Y-axis than a Y-axial center of the flat plate portion 21 in its end portion on the negative direction side of the X-axis. An end portion of the fourth end-side projection 23D on the positive direction side of the Y-axis is connected to the weight portion 13. An end portion of the fourth end-side projection 23D on the negative direction side of the Y-axis is positioned on the more positive direction side of the Y-axis than the Y-axial center of the flat plate portion 21 in its end portion on the negative direction side of the X-axis.

By utilizing the SOI substrate as the substrate portion 11, the beam 14 having the above-described shape is able to be formed easily. More specifically, the beam 14 is able to be formed in a smaller number of steps by carrying out a step of etching the SOI layer 11A by using, as an etching stop layer, the insulator layer between the SOI layer 11A and the base layer 11B of the SOI substrate, a step of turning over the SOI substrate, and a step of etching the base layer 11B.

Figure 3A:
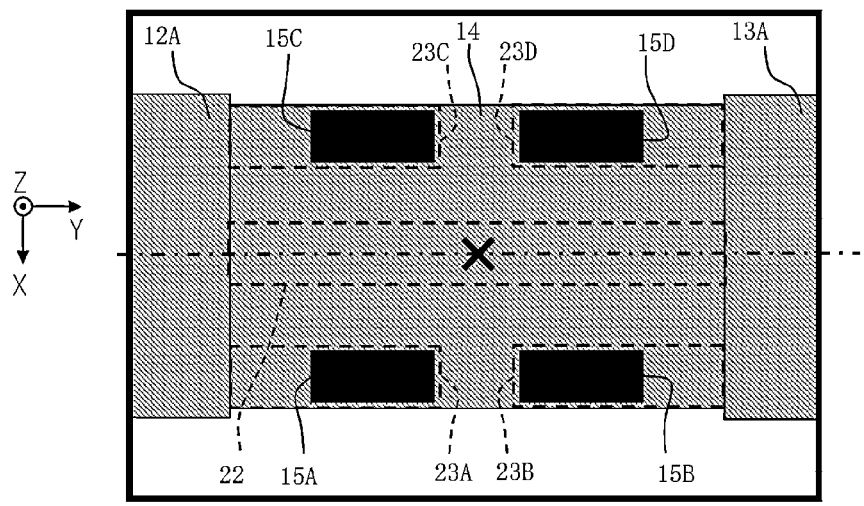
FIGS. 3A and 3B are illustrations to explain piezoresistors included in the angular acceleration sensor according to the first preferred embodiment of the present invention.

FIG. 3A is an illustration to explain the piezoresistors 15A, 15B, 15C and 15D disposed in the beam 14.

The piezoresistors 15A, 15B, 15C and 15D are detection elements in this preferred embodiment and are disposed on the surface of the flat plate portion 21 of the beam 14 on the positive direction side of the Z-axis. While, as described above, the piezoresistor 15A is connected to the wiring line 17A, the piezoresistor 15B is connected to the wiring line 17B, the piezoresistor 15C is connected to the wiring line 17C, and the piezoresistor 15D is connected to the wiring line 17D, the wiring lines 17A, 17B, 17C and 17D are not illustrated in FIGS. 3A and 3B. The piezoresistors 15A, 15B, 15C and 15D are formed preferably by diffusing (doping) p-type impurities into the SOI layer 11A in the flat plate portion 21 of the beam 14.

The piezoresistor 15A is disposed in the end portion of the beam 14 on the positive direction side of the X-axis at a position on the more negative direction side of the Y-axis than the center of the beam 14 in the Y-axis direction when viewed in an X-Y plane. The piezoresistor 15B is disposed in the end portion of the beam 14 on the positive direction side of the X-axis at a position on the more positive direction side of the Y-axis than the center of the beam 14 in the Y-axis direction when viewed in an X-Y plane. The piezoresistor 15C is disposed in the end portion of the beam 14 on the negative direction side of the X-axis at a position on the more negative direction side of the Y-axis than the center of the beam 14 in the Y-axis direction when viewed in an X-Y plane. The piezoresistor 15D is disposed in the end portion of the beam 14 on the negative direction side of the X-axis at a position on the more positive direction side of the Y-axis than the center of the beam 14 in the Y-axis direction when viewed in an X-Y plane.

Here, the beam 14 is constituted such that, when viewed in an X-Y plane, a position (denoted by a mark x) of the center of gravity of the weight portion 13 lies on a line (denoted by a one-dot-chain line) passing the center of the beam as viewed in the widthwise direction (i.e., in the X-axis direction) and being parallel or substantially parallel to the Y-axis, and that the position of the center of gravity of the weight portion 13 is aligned or substantially aligned with the center of the beam 14. Furthermore, the beam 14 has a shape that is line-symmetrically with respect to a symmetric axis given by a line being parallel or substantially parallel to the X-axis and passing the center of the beam 14, and that is line-symmetrically with respect to a symmetric axis given by a line being parallel or substantially parallel to the Y-axis and passing the center of the beam 14.

The piezoresistors 15A, 15B, 15C and 15D are also arranged line-symmetrically with respect to a symmetric axis given by the line being parallel to the X-axis and passing the center of the beam 14, and line-symmetrically with respect to a symmetric axis given by the line being parallel and substantially parallel to the Y-axis and passing the center of the beam 14. Thus, flexure stress generated upon flexure of the beam 14 in the X-axis direction is distributed almost line-symmetrically with respect to a symmetric axis given by the line being parallel or substantially parallel to the X-axis and passing the center of the beam 14, and almost line-symmetrically with respect to a symmetric axis given by the line being parallel to the Y-axis and passing the center of the beam 14.

Figure 3B:
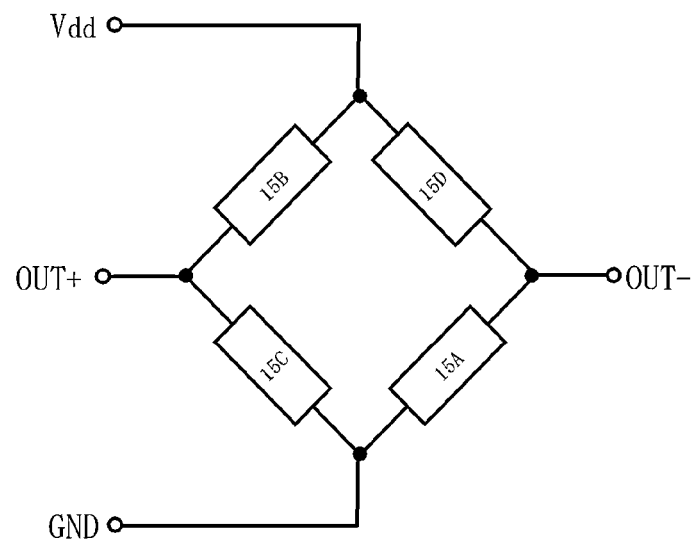

FIG. 3B is a circuit diagram to explain a basic configuration of a detection circuit that preferably includes the piezoresistors 15A, 15B, 15C and 15D.

The piezoresistor 15A is connected in series to the piezoresistor 15D. The piezoresistor 15B is connected in series to the piezoresistor 15C. A serial circuit made up of the piezoresistors 15A and 15D and a serial circuit made up of the piezoresistors 15B and 15C are connected to each other in parallel. Moreover, a junction point between the piezoresistor 15B and the piezoresistor 15D is connected to an output terminal Vdd of a constant voltage source, and a junction point between the piezoresistor 15A and the piezoresistor 15C is connected to a ground GND. A junction point between the piezoresistor 15A and the piezoresistor 15D is connected to an output terminal OUT, and a junction point between the piezoresistor 15B and the piezoresistor 15C is connected to an output terminal OUT$_+$.

Thus, the piezoresistors 15A, 15B, 15C and 15D constitute a Wheatstone bridge circuit. The piezoresistor 15A and the piezoresistor 15D constituting the serial circuit in the Wheatstone bridge circuit are disposed on the opposite sides with respect to the center of the beam 14, and the piezoresistor 15B and the piezoresistor 15C constituting the serial circuit in the Wheatstone bridge circuit are also disposed on the opposite sides with respect to the center of the beam 14. Accordingly, potentials of output signals from the output terminals OUT$_+$ and OUT$_-$ are changed in mutually reversed polarities upon flexure of the beam 14 along the X-axis, such that the angular acceleration with the Z-axis being a rotation axis is able to be measured by utilizing a potential difference between the output signals. By constituting the Wheatstone bridge circuit, detection sensitivity of the angular acceleration sensor 10 is increased in comparison with that of an angular acceleration sensor in which a detection circuit is constituted by including a resistive voltage-dividing circuit made up of two piezoresistors.

Furthermore, as illustrated in FIG. 3A, the piezoresistor 15A is opposed in the Z-axis direction to the first end-side projection 23A, which is disposed on the surface of the flat plate portion 21 of the beam 14 on the negative direction side of the Z-axis. The piezoresistor 15B is opposed in the Z-axis direction to the second end-side projection 23B, which is disposed on the surface of the flat plate portion 21 of the beam 14 on the negative direction side of the Z-axis. The piezoresistor 15C is opposed in the Z-axis direction to the third end-side projection 23C, which is disposed on the surface of the flat plate portion 21 of the beam 14 on the negative direction side of the Z-axis. The piezoresistor 15D is opposed in the Z-axis direction to the fourth end-side projection 23D, which is disposed on the surface of the flat plate portion 21 of the beam 14 on the negative direction side of the Z-axis.

When the beam is constituted only by the flat plate portion, flexure stress is generated in the flat plate portion in a way distributed over an X-Y plane upon flexing of the beam in the X-axis direction such that larger flexure stress is generated at a position nearer to a center of the flat plate portion in the Y-axis direction, and smaller flexure stress is generated at a position farther away from the center of the flat plate portion in the Y-axis direction.

In the angular acceleration sensor 10 according to this preferred embodiment, however, since the beam 14 has the flat plate portion 21, the central projection 22, and the first to fourth end-side projections 23A to 23D, a position where maximum flexure stress is generated in the beam 14 preferably is set to regions where the piezoresistors 15A, 15B, 15C and 15D are disposed, instead of the center of the beam 14 in the Y-axis direction.

Figure 4:
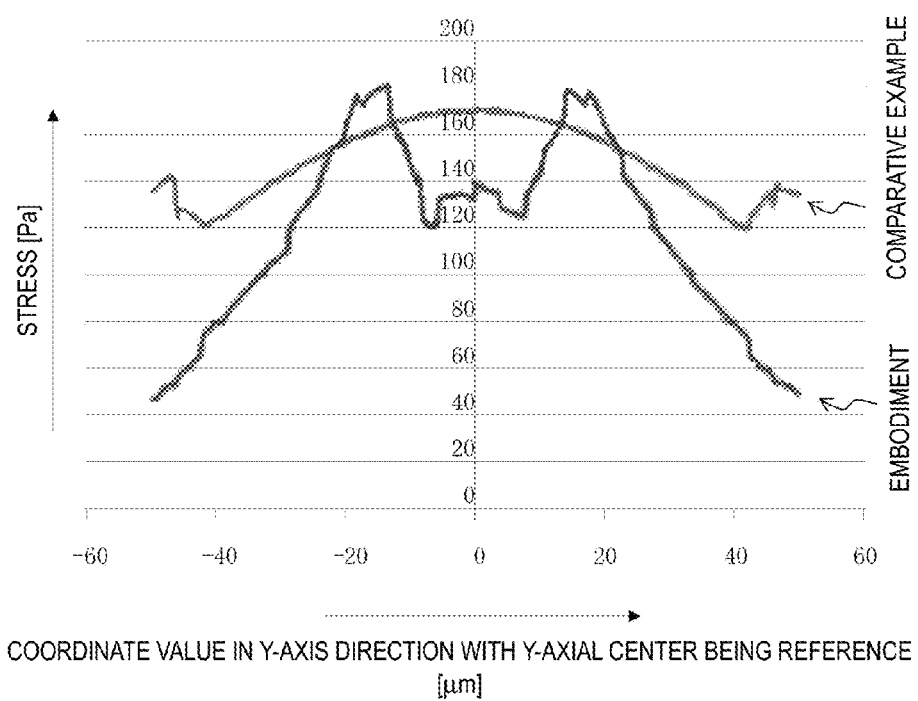
FIG. 4 is a graph to explain a distribution of flexure stress in the beam included in the angular acceleration sensor according to the first preferred embodiment of the present invention.
Figure 5A:
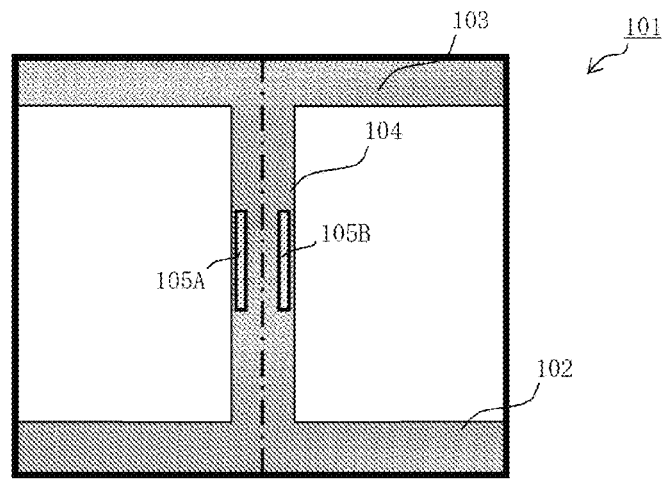
FIGS. 5A to 5C are illustrations to explain an angular acceleration sensor according to a first related-art configuration example.
Figure 5B:
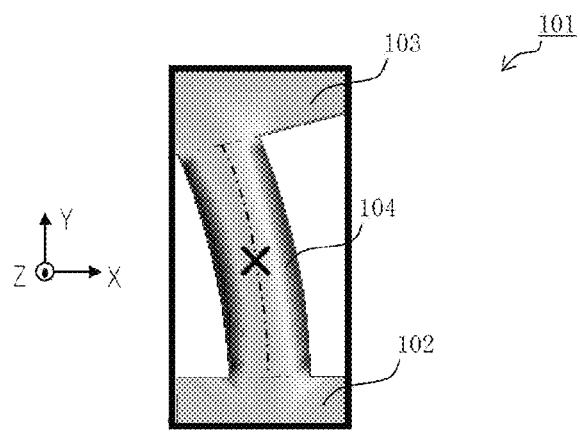
Figure 5C:
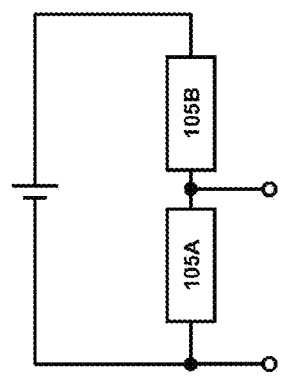
Figure 6A:
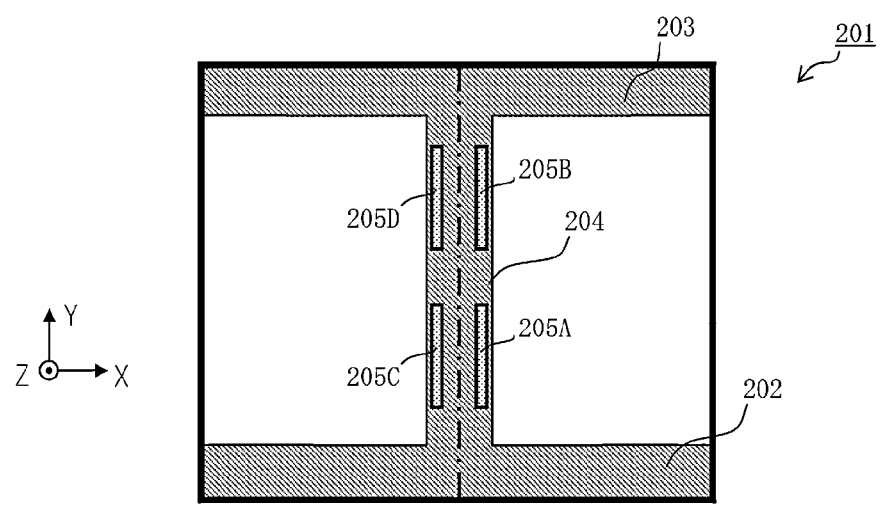
FIGS. 6A and 6B are illustrations to explain an angular acceleration sensor according to a second related-art configuration example.
Figure 6B:
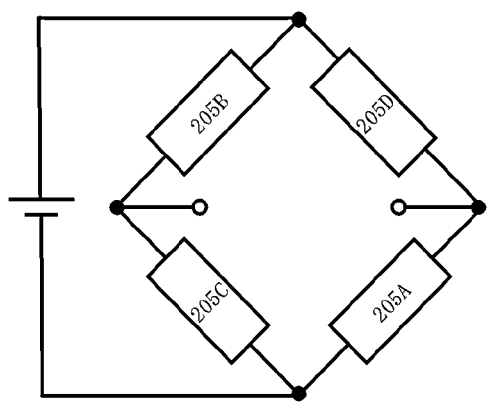

FIG. 4 is a graph to explain a relationship between flexure stress (main stress $\sigma_{yy}$) and a coordinate value in the Y-axis direction on a line, which passes the piezoresistors 15A and 15B and which is parallel or substantially parallel to the Y-axis, in a state where the beam 14 is flexed in the X-axis direction. FIG. 4 further plots flexure stress generated in an angular acceleration sensor as Comparative Example in which the beam is constituted only by the flat plate portion.

As seen from FIG. 4, in the angular acceleration sensor as Comparative Example, when the beam is flexed in the X-axis direction, flexure stress is generated in a way distributed over an X-Y plane in the shape of a quadratic curve with respect to the coordinate value in the Y-axis direction, and maximum flexure stress is generated at the center of the beam in the Y-axis direction. On the other hand, in the angular acceleration sensor 10 according to this preferred embodiment, when the beam 14 is flexed in the X-axis direction, flexure stress is generated in a way distributed over an X-Y plane, and maximum flexure stress is generated at a position on the more positive direction side of the Y-axis than the center of the beam 14 in the Y-axis direction and at a position on the more negative direction side of the Y-axis than the center of the beam 14 in the Y-axis direction. Moreover, in the angular acceleration sensor 10 according to this preferred embodiment, the beam 14 includes the piezoresistors 15B and 15D each located at the position on the more positive direction side of the Y-axis than the center of the beam 14 in the Y-axis direction where the maximum flexure stress is generated, and the piezoresistors 15A and 15C each located at the position on the more negative direction side of the Y-axis than the center of the beam 14 in the Y-axis direction where the maximum flexure stress is generated. In the angular acceleration sensor 10 according to this preferred embodiment, therefore, the maximum flexure stress generated in the beam 14 is able to be detected by the piezoresistors 15A, 15B, 15C and 15D that are disposed at positions different from the center of the beam 14 in the Y-axis direction, and sensitivity is increased.

Angular acceleration sensors according to the present invention are realized with the configurations described in the foregoing preferred embodiments. It is to be noted that the present invention can also be practiced in other various configurations than the foregoing preferred embodiments.

An acceleration sensor configured to detect an acceleration along the X-axis can also be provided, instead of the angular acceleration sensor configured to detect an angular acceleration about the Z-axis, by modifying the circuit configuration of the detection circuit in the angular acceleration sensor 10 according to the first preferred embodiment of the present invention. In such an acceleration sensor, it is similarly possible to detect maximum flexure stress generated in a beam by a piezoresistor that is disposed at a position different from a center of the beam in the lengthwise direction thereof, and to increase sensitivity.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An angular acceleration sensor comprising:
a stationary portion;
a weight portion movably supported on the stationary portion;
a beam including a flat plate portion including a flat plate, one end portion of the flat plate portion in a lengthwise direction thereof being connected to the stationary portion and the other end portion thereof being connected to the weight portion, a central projection that projects in a thickness direction of the flat plate portion, the thickness direction being perpendicular or substantially perpendicular to the lengthwise direction, and that is disposed at a center of the flat plate portion in a widthwise direction perpendicular or substantially perpendicular to both the lengthwise direction and the thickness direction of the flat plate portion, and a plurality of end-side projections that are disposed at opposite ends of the flat plate portion in the widthwise direction, respectively, and that project in the thickness direction of the flat plate portion; and
a plurality of detection elements that are disposed on the flat plate portion at positions different from a center of the flat plate portion in the lengthwise direction, and that detect stress generated in the beam.

2. The angular acceleration sensor according to claim 1, wherein the central projection extends past a center of the beam when viewed in a plane defined by the lengthwise direction and the widthwise direction of the flat plate portion.

3. The angular acceleration sensor according to claim 1, wherein one end portion of the central projection in the lengthwise direction of the flat plate portion is connected to the stationary portion, and the other end portion thereof is connected to the weight portion.

4. The angular acceleration sensor according to claim 1, wherein the plurality of end-side projections include:
a first end-side projection disposed in the one end portion of the flat plate portion in the widthwise direction, one end portion of the first end-side projection in the lengthwise direction of the flat plate portion being connected to the stationary portion and the other end portion thereof being located at a position closer to the stationary portion than a center of the flat plate portion in the lengthwise direction;
a second end-side projection disposed in the one end portion of the flat plate portion in the widthwise direction, one end portion of the second end-side projection in the lengthwise direction of the flat plate portion being connected to the weight portion and the other end portion thereof being located at a position closer to the weight portion than the center of the flat plate portion in the lengthwise direction;
a third end-side projection disposed in the other end portion of the flat plate portion in the widthwise direction, one end portion of the third end-side projection in the lengthwise direction of the flat plate portion being connected to the stationary portion and other end portion thereof being located at a position closer to the stationary portion than the center of the flat plate portion in the lengthwise direction; and
a fourth end-side projection disposed in the other end portion of the flat plate portion in the widthwise direction, one end portion of the fourth end-side projection in the lengthwise direction of the flat plate portion being connected to the weight portion and other end portion thereof being located at a position closer to the weight portion than the center of the flat plate portion in the lengthwise direction.

5. The angular acceleration sensor according to claim 4, wherein the plurality of detection elements include:
a detection element opposed to the first end-side projection in the thickness direction of the flat plate portion;
a detection element opposed to the second end-side projection in the thickness direction of the flat plate portion;
a detection element opposed to the third end-side projection in the thickness direction of the flat plate portion; and
a detection element opposed to the fourth end-side projection in the thickness direction of the flat plate portion.

6. The angular acceleration sensor according to claim 5, wherein the plurality of detection elements define a bridge circuit.

7. The angular acceleration sensor according to claim 1, wherein the stationary portion surrounds the weight portion and the beam.

8. The angular acceleration sensor according to claim 1, wherein the stationary portion includes an opening including the weight portion and the beam disposed therein.

9. The angular acceleration sensor according to claim 1, wherein the weight portion includes a recessed portion disposed opposite to a projection of the stationary portion.

10. The angular acceleration sensor according to claim 1, wherein the beam is located at a center of gravity of the weight portion.

* * * * *